(12) United States Patent
Fitzler et al.

(10) Patent No.: US 7,568,855 B2
(45) Date of Patent: Aug. 4, 2009

(54) ARRANGEMENT FOR AXIAL SECURING OF GROOVED BOLT

(75) Inventors: Stefan Fitzler, Iserlohn (DE); Sven Müller, Breckerfeld (DE); Reinhard Birkigt, Herdecke (DE); Udo Gersemsky, Herdecke (DE)

(73) Assignee: Demag Cranes & Components GmbH, Wetter (DE)

( * ) Notice: Subject to any disclaimer, the term of this patent is extended or adjusted under 35 U.S.C. 154(b) by 265 days.

(21) Appl. No.: 11/499,940

(22) Filed: Aug. 7, 2006

(65) Prior Publication Data
US 2007/0029460 A1 Feb. 8, 2007

(30) Foreign Application Priority Data
Aug. 8, 2005 (DE) .................. 10 2005 037 825

(51) Int. Cl.
*F16B 21/09* (2006.01)
(52) U.S. Cl. .................. 403/315; 403/326; 411/522
(58) Field of Classification Search .......... 403/1, 403/315, 326, 327, 328, DIG. 7; 411/522, 411/523, 524
See application file for complete search history.

(56) References Cited

U.S. PATENT DOCUMENTS

| | | | | |
|---|---|---|---|---|
| 1,923,767 A | * | 8/1933 | Weldon | ............ 184/90 |
| RE26,769 E | * | 1/1970 | Burner, Jr. | ............ 403/361 |
| 4,009,896 A | * | 3/1977 | Brewer | ............ 285/305 |
| RE29,752 E | * | 9/1978 | Jaconette, Jr. | ............ 439/97 |
| 4,729,706 A | * | 3/1988 | Peterson et al. | ............ 411/175 |
| 4,883,397 A | * | 11/1989 | Dubost | ............ 411/174 |
| 5,000,614 A | * | 3/1991 | Walker et al. | ............ 403/326 |
| 5,048,996 A | * | 9/1991 | DuBois et al. | ............ 403/287 |
| 5,131,785 A | * | 7/1992 | Shimazaki | ............ 403/326 |
| 5,423,646 A | * | 6/1995 | Gagnon | ............ 411/184 |
| 5,518,332 A | * | 5/1996 | Katoh | ............ 403/155 |
| 5,704,100 A | | 1/1998 | Swan | |
| 5,713,707 A | * | 2/1998 | Gagnon | ............ 411/175 |
| 6,178,844 B1 | * | 1/2001 | Burger | ............ 74/502.4 |
| 6,234,706 B1 | * | 5/2001 | Hodzic | ............ 403/252 |
| 6,854,946 B2 | * | 2/2005 | Bauer | ............ 411/523 |

FOREIGN PATENT DOCUMENTS

| | | |
|---|---|---|
| DE | 80 19 658.3 | 12/1981 |
| DE | 37 04 650 A1 | 9/1987 |
| DE | 20 2004 019 671 U1 | 4/2005 |
| EP | 0 990 807 A1 | 4/2000 |
| FR | 2745612 A | 9/1997 |

OTHER PUBLICATIONS

European Search Report, Mar. 5, 2009.

* cited by examiner

*Primary Examiner*—Daniel P Stodola
*Assistant Examiner*—Nahid Amiri
(74) *Attorney, Agent, or Firm*—Van Dyke, Gardner, Linn & Burkhart, LLC

(57) ABSTRACT

An arrangement for axial securing of a grooved bolt includes a holding element and a securing element. The grooved bolt passes through the holding element in the axial direction. The securing element, which may be connected to the holding element, engages the groove of the bolt and secures the bolt in a locked position.

21 Claims, 8 Drawing Sheets

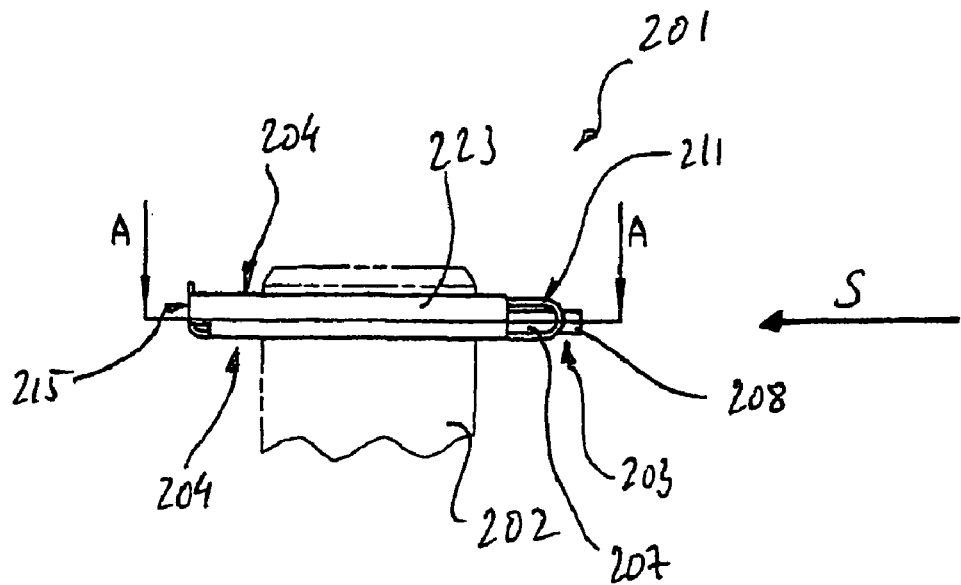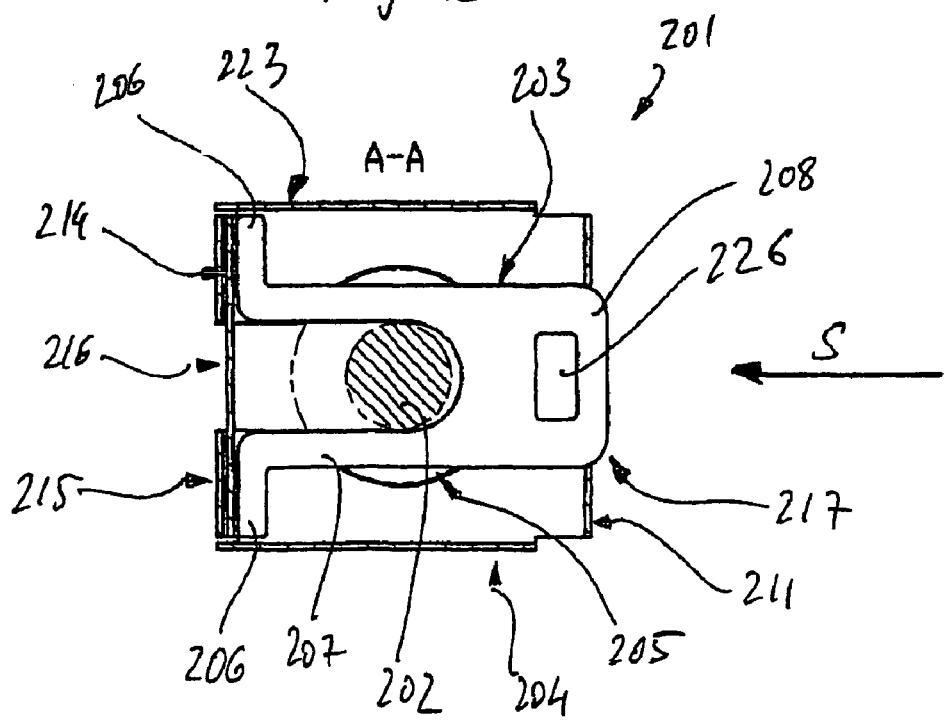

ARRANGEMENT FOR AXIAL SECURING OF GROOVED BOLT

FIELD OF THE INVENTION

The present invention relates generally to bolt retention arrangements.

BACKGROUND OF THE INVENTION

Devices such as bolt retentions are familiar in many different forms. One version is a securing clip, which is pressed into a groove of a bolt to achieve a clamping effect. For example, such a clip is shown in DE 37 04 650 C2. In DE 37 04 650 C2, to achieve a clamping retention, the spring force provided by the clip is overcome when the clip is inserted into the groove. Similarly, the spring force must again be overcome to remove the clip. Often, the clips become bent or deformed during this process.

Securing clamps, such as those of DE 80 19 658 U1, are also known. Besides having a U-shaped clip or plate inserted into a groove of a bolt, these clamps have a securing element that includes two tongues curved toward each other, which encircle the bolt in the locked position. The clamping effect of the tongues holds the U-shaped clip in the locked position in the groove. Because these clamps are punched out and bent into shape from a single metal sheet, the retaining force of the clip and the spring force of the tongues may not be chosen arbitrarily or independently of each other. The entire structural piece is also subjected to the axial forces of the bolt.

From each of DE 20 2004 019 671 U1, EP 0 990 807 A1, U.S. Pat. Nos. 4,009,896 and 5,518,332, arrangements for axial securing of a grooved bolt are known, in which a spring wire is spread apart and introduced into the groove. In these arrangements, the bolt is held by the clamping force of the spring, and the actual retention is provided by the spring wire. However, additional elements may be provided, such elements being connected to a securing wire and functioning to cover it, to hold it in the released position, or to secure other devices through which the bolt passes.

SUMMARY OF THE INVENTION

The present invention provides a reliable arrangement for axial securing of a grooved bolt. The device is minimal in size and does not require costly machining of the bolt.

According to an aspect of the invention, an arrangement for axial securing of a grooved bolt includes a holding element and a securing element. The holding element includes an opening, through which the grooved bolt passes in the axial direction. The securing element engages the groove of the bolt in at least opposite regions of the groove and secures the bolt in the locked position. Thus, the bolt is held in the locked position by the securing element at the level of the groove, and the securing element at least partially encloses the bolt in the locked position. To loosen the securing element, the securing element moves relative to the holding element, from the locked position into an open position. Thus, a straightforward mounting and dismounting, or locking and releasing, of the securing element is achieved.

The securing element engages the groove and functions to axially secure the bolt. The securing element may be easily pressed into and out of the groove. The holding element functions to protect the securing element from being accidentally or unintentionally loosened. Optionally, the holding element may be joined to the securing element, in which case the holding element may perform a capturing function. The holding element may also perform a holding function, in that it holds the securing element against the groove in the locked position.

Optionally, the securing element may perform a holding function, in addition to the locking function. In that case, the holding element performs a protecting function and a capturing function. The holding element may also perform a holding function, so that a secondary safety mechanism is provided. Thus, there may be a separation of the respective functions and the corresponding elements may be optimized accordingly.

Optionally, the holding element may hold the securing element in the locked position by form fitting or by at least partially enclosing it.

Optionally, the securing element may be a U-shaped securing clip. The securing clip may be a curved wire or a sheet metal element. Further, the U-shaped securing clip may include two parallel legs having free ends at which outwardly pointing bends may be positioned. The bends may join the securing element to the holding element and may function to hold the securing element in the locked position.

Optionally, the holding element may be an essentially U-shaped metal plate, at least partially embracing the securing element. An opening may be positioned in the middle of the holding element; the opening may be pressed onto the bolt. The essentially U-shaped metal plate may be produced by stamping and/or shaping, which is relatively easy and inexpensive.

Further, guide straps may be positioned at a border of the opening of the holding element. The length of the guide straps, looking in the direction in which the holding element is pressed onto the bolt, is greater than the width of the groove. The legs of the holding element are prevented from slipping into the groove as it is being pressed onto the bolt, which would cause difficulty assembling and/or positioning the bolt retention arrangement.

Optionally, the holding element may have spring-action detent surfaces, which prevent the securing element from moving from the locked position into the open position. The detent surfaces provide for ease of locking and loosening of the securing element. Because the securing element is not required to perform a holding function, the locking function may be optimized. Thus, there may be a separation of functions for the securing element and the holding element. The securing element engages the groove and functions to axially secure the bolt. Because the securing element is not required to be spring-tensioned in the direction of the groove, the securing element may be pressed into and out of the groove and may be held in the locked position by the holding element and its detent surfaces. Thus, the holding element performs a holding function. Further, the outwardly pointing bends of the securing element may interlock with the detent surfaces in the locked position, such that the securing element is held in the locked position.

Optionally, the securing element may move between the legs of the holding element from the open position at one end of the element to the locked position at the opposite end of the element.

The securing element may be joined captively to the holding element in the open position, wherein the holding element includes a recess in the curve between the two legs. The recess in the curve is configured such that the securing element and the two legs of the securing element may be pushed through the recess from the locked position to the open position. Therefore, the two bends of the securing element remain between the upper and lower legs of the holding element in the open position.

Optionally, to achieve a large spring force and thus good detent action, as well as reusability of the holding element, one leg of the holding element, in the region of its free end, may be elastically tensioned against the opposite leg to form at least one detent surface in the locked position.

Optionally, the holding element may include an upper leg and a lower leg, wherein the lower leg may have a length that is longer than that of the upper leg. At least one bend may be positioned at the free end of the lower leg. In the locked position, the securing element may be held by the at least one bend, or between the bend and the at least one detent surface formed by the upper leg. Thus, the securing element may be held firmly in the groove and against the direction of locking.

Optionally, the holding element may be configured such that the upper leg is curved transversely to the locking direction until it abuts against the lower leg. Thus, the free end of the upper leg may have a bend, which may form a detent surface. The bend and/or detent surface may include a plurality of recesses, through which the legs of the securing element may extend. Thus, the bends of the securing element may be reliably held in the locked position by a relatively large detent surface.

Optionally, the holding element may include detent surfaces formed at the free end of the upper leg, such that the free end is curved, for example, at a slant, in the locking direction until it abuts against the lower leg. Although the detent surfaces may become smaller, the downwardly curved ends of the upper leg are positioned near the edge of the upper leg. Thus, the legs of the securing element may be brought into the locked position past the detent surfaces to engage the bends behind the detent surfaces. Forming the corresponding recesses is not required.

Optionally, the detent surfaces may be formed on the upper leg such that spring straps are positioned at the free end of the upper leg. The spring straps may be curved at a slant in the direction of the lower leg. Thus, the detent surfaces may be formed at or near the free ends of the lower leg. In such a configuration, a small cutout from the upper leg, in the form of spring straps, is curved downward to form a detent surface. Thus, the holding element may have a block-like outer contour. In this configuration, the securing element is housed and protected by the holding element in the locked position.

Optionally, and as discussed above, the holding element may perform a protecting function and a capturing function. When performing both of these functions, the holding element may be configured as described above, but may not have detent surfaces. The securing element may have at least one constriction and at least one widening, such that the securing element may be locked in a clamping fashion against the groove in the locked position. Thus, detent surfaces on the holding element are not required. Accordingly, the securing element may perform a holding function, in addition to the securing function (see above).

To dismantle the arrangement by loosening the securing element, a dismantling window may be provided in the holding element, through which a releasing means may extend to unlock or release the securing element. Further, the dismantling window may be provided in a bend of the holding element. The dismantling function may be performed with any suitable releasing means, such as a tool or screwdriver or the like. Alternately, the element may have a lever strap to release the securing clip, such that no tool is required.

Thus, the various embodiments disclosed herein achieve effective bolt retention by the interaction of two structural elements, the securing element and the holding element, which move in different directions with respect to each other. Thus, a straightforward mounting and dismounting, or locking and releasing, of the securing element is achieved. It should be understood that various combinations of the above-mentioned embodiments are possible.

These and other objects, advantages, purposes and features of the present invention will become apparent upon review of the following specification in conjunction with the drawings.

BRIEF DESCRIPTION OF THE DRAWINGS

FIG. 11 is a side view of the bolt retention of FIG. 10;

FIG. 12 is a top sectional view of the bolt retention of FIG. 11;

DESCRIPTION OF THE PREFERRED EMBODIMENTS

Figure 1:
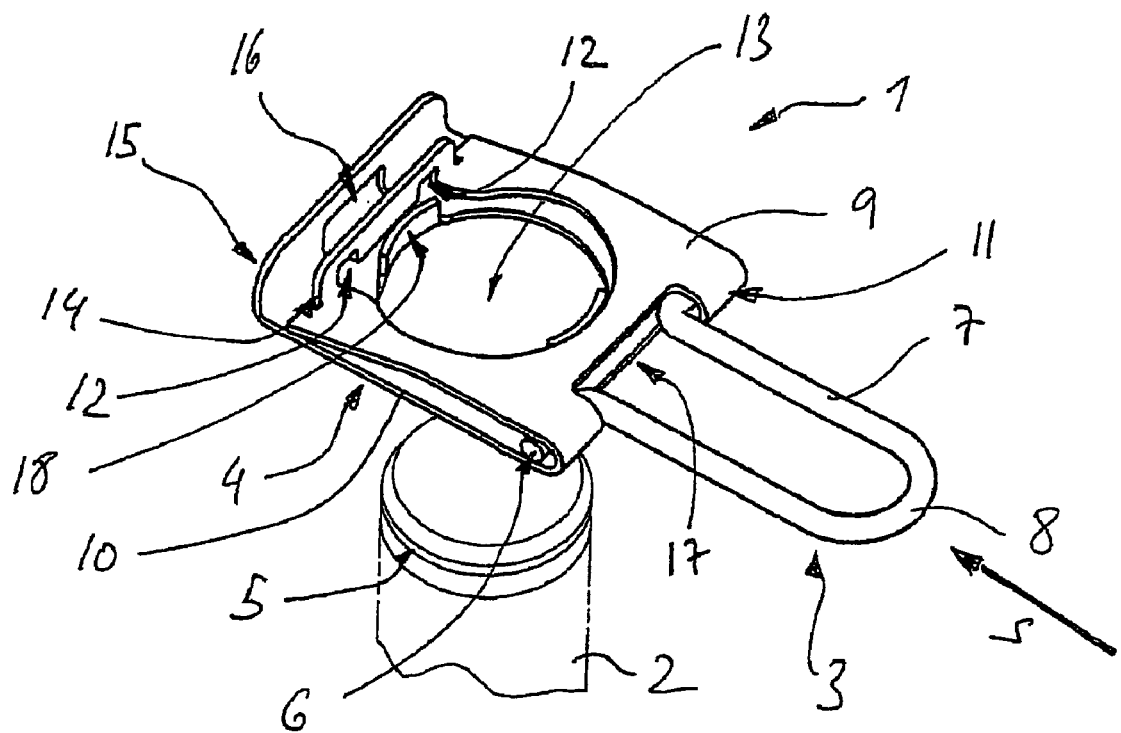
FIG. 1 is a perspective view looking down on a bolt head with a bolt retention according to the present invention, prior to locking.
Figure 2:
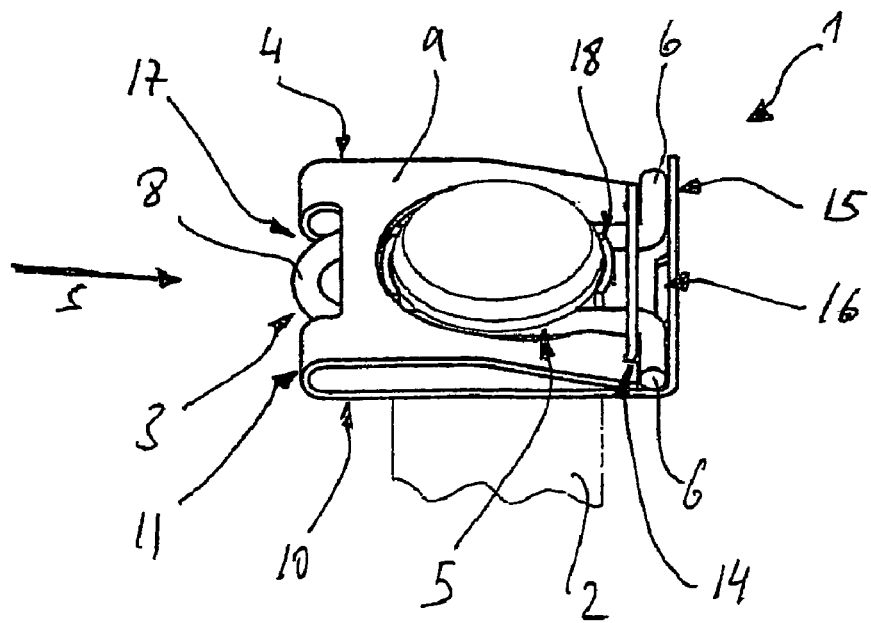
FIG. 2 is a perspective view of the bolt retention of FIG. 1 in the locked position.
Figure 3:
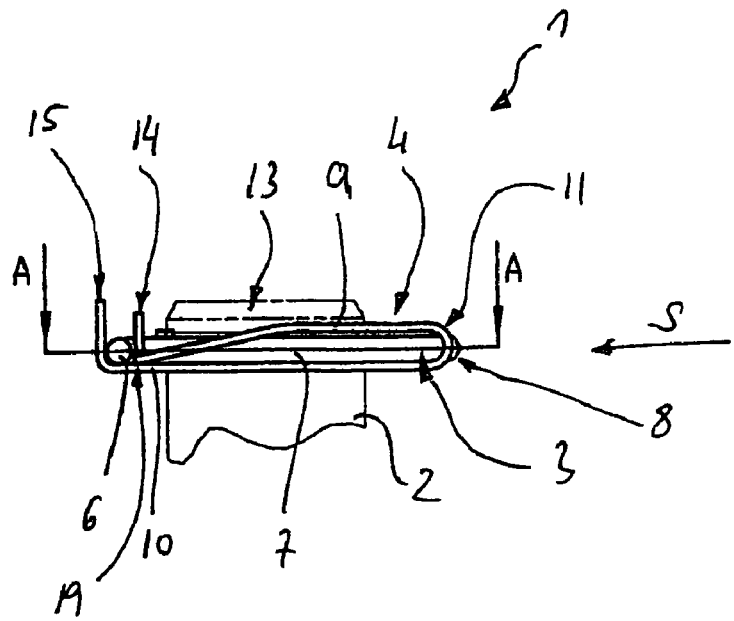
FIG. 3 is a side view of the bolt retention of FIG. 2.
Figure 4:
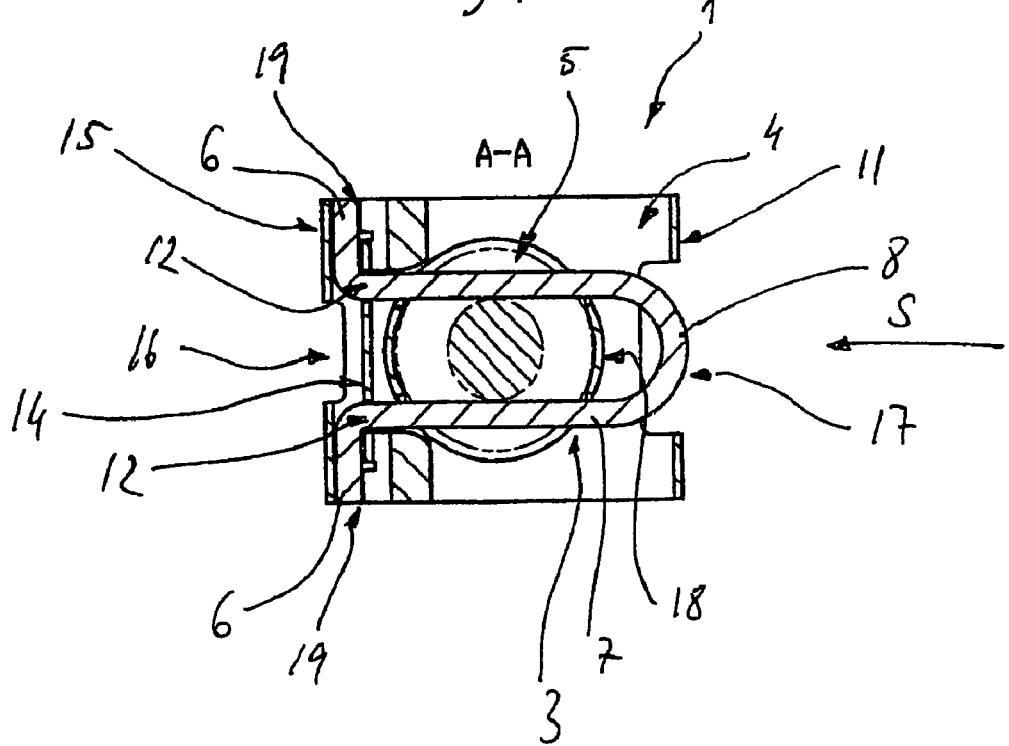
FIG. 4 is a top sectional view of the bolt retention of FIG. 3.

Referring now to the drawings and the embodiments illustrated therein, the overall arrangement 1, 101, 201, 301 for axial locking of a bolt 2, 102, 202, 302 or the like, provided with a groove 5, 105, 205, 305, i.e., a bolt retention, is shown in FIGS. 1-16. The arrangement or bolt retention 1, 101, 201, 301 comprises a securing element 3, 103, 203, 303, which may be configured as a locking clip that moves from an open position to a locked position relative to a holding element 4, 104, 204, 304. In the locked position, securing element 3, 103, 203, 303 engages groove 5, 105, 205, 305 and is at least partially enclosed by holding element 4, 104, 204, 304, which may be configured as a U-shaped metal plate and may be movably connected to securing element 3, 103, 203, 303.

As shown in FIGS. 1-4, bolt retention 1 includes securing element 3, which comprises a steel wire. Securing element 3 corresponds to groove 5 and has a generally U-shaped form. Securing element 3 includes two parallel legs 7, joined together by a curve 8. Spacing between legs 7 corresponds to a diameter of groove 5. Legs 7 each have a free end, at which legs 7 each include an outwardly directed bend 6, wherein bend is approximately 90 degrees. The outwardly pointing bends 6 lie in the same plane as securing element 3 and are pointed away from each other. Thus, securing element 3 somewhat resembles the letter Omega.

Holding element 4 is formed from a suitable spring steel and has a basically U-shaped form. Holding element 4 has a first upper leg 9 and a second lower leg 10. Upper leg 9 and lower leg 10 are generally parallel and are oriented generally perpendicular to the axis of bolt 2 in the locked position of bolt retention 1. Upper leg 9 lies on top or outside of bolt 2 and has a length that is shorter than that of lower leg 10.

As shown in FIGS. 1-4, holding element 4 includes an opening 13, positioned between legs 9, 10. Opening 13 is adapted to the diameter of the bolt 2, so that holding element 4 may be pressed and/or slid onto bolt 2. Guide straps 18 may be provided at two sides of opening 13 to prevent spring plate or holding element 4 from becoming stuck or jammed at or in groove 5. Accordingly, the length of guide straps 18, looking in the lengthwise direction of bolt 2, is greater than the width of groove 5. Guide straps 18 may be formed by bent sheet metal straps, and the length of the straps may generally correspond to the spacing between legs 9, 10.

Moreover, holding element 4 may have a U-shaped form, including a curve 11, joining legs 9, 10. Curve 11 is configured such that the spacing between legs 9, 10 generally corresponds to the diameter of the wire of securing element 3. A recess 17 may be included in the center region of curve 11. Recess 17 corresponds to a width of securing element 3 in the region of legs 7 and curve 8, such that securing element 3 may be pushed back from the locked position to the open position through recess 17, except for its outwardly pointing bends 6.

As shown in FIGS. 1-4, a generally 90 degree bend 14, 15 may be provided at each of the free ends of legs 9, 10. Bends 14, 15 are parallel to each other and face upward in the same direction. Bend 15 runs across an entire width of leg 10. In contrast, bend 14 does not run across the entire width of leg 9. At either end of leg 9, a noncanted piece or strap extends underneath the middle of locking clip or securing element 3 and forms detent surfaces 19. Due to the different lengths of legs 9, 10, a space is formed between bends 14, 15, which serves to accommodate outwardly pointing bends 6 of securing element 3 in the locked position.

Leg 9 of holding element 4 is generally parallel to leg 10 after curve 11. In the generally middle region of leg 9, leg 9 turns or kinks in the direction of leg 10, such that leg 9 bears against leg 10 at approximately the transition to bend 14. Because of the pretensioning, securing element 3 may not be pulled off of leg 9. Rather, securing element 3 is clamped between legs 9, 10.

The overall width and length of holding element 4 corresponds to the overall width and length of securing element 3, including outwardly pointing bends 6. In the locked position, securing element 3 fits with its outer contour at least partially within a contour of holding element 4.

As shown in FIG. 1, in the open position, securing element 3 may hang loosely on holding element 4. Legs 7 and curve 8 of securing element 3 protrude through recess 17 of holding element 4 such that outwardly pointing bends 6 of securing element 3 are held between legs 9, 10 of holding element 4, generally at curve 11. Securing element 3 hangs by legs 7 and curve 8 through recess 17 of holding element 4 at curve 11.

To assemble the arrangement of the present invention, holding element 4 is pressed onto bolt 2, such that bolt 2 protrudes through opening 13 in holding element 4. Holding element 4 is guided along guide straps 18 on bolt 2, such that securing element 3 is prevented from engaging groove 5. At groove 5, securing element 3 projects outward, in a generally sideways direction, from recess 17. Securing element 3 is pressed in the locking direction S, sideways, into groove 5, until it catches behind detent surfaces 19 of upper leg 9 of holding element 4. To perform this function, securing element 3 need only overcome the spring force of holding element 4. Because of the configuration of the arrangement of the present invention, the pressing of securing element 3 occurs along an inclined plane and therefore requires very slight force.

Securing element 3, having two outwardly pointing bends 6, is pushed in the locking direction S into the region of the abutting free ends of legs 9, 10 of holding element 4, such that upper leg 9 lifts elastically up and off of lower leg 10. Outwardly pointing bends 6 may slip further in the locking direction S between legs 9, 10, until they come to bear against outer bend 15 of lower leg 10. Concurrently, outwardly pointing bends 6 lose contact with the free end of the shorter upper leg 9, and the upper leg 9 snaps back to bear against lower leg 10 as a result of the spring tensioning.

As shown in FIG. 1, bend 14 of upper leg 9 includes two recesses 12, which open downward to lower leg 10. Legs 7 of securing element 3 extend through recesses 12 when securing element 3 is in the locked position.

In the locked position, securing element 3 is prevented from moving against the locking direction S and along holding element 4 by straps adjacent to bend 14 of upper leg 9. The straps function as a detent surface and thus prevent securing element 3 from moving against the locking direction S.

Securing element 3 may be form fitted in holding element 4, the spring force of which is chosen to ensure a reliable holding of securing element 3. Because of the form fitting, securing element 3 is not required to produce its own clamping force on bolt 2, resulting in less strain on securing element 3. Because axial forces on bolt 2 are primarily absorbed by securing element 3, holding element 4 is generally only under the strain of its own spring force.

To dismantle the arrangement, bolt retention I includes a dismantling window 16 in bend 15 of holding element 4. In the locked position, legs 9, 10 of holding element 4 are pressed together. To separate legs 9, 10 and to release securing element 3 from bolt 2, a releasing means, such as a tool or screw driver or the like, is pushed through dismantling window 16 underneath upper leg 9. The tool functions to raise leg 9. Thus, bends 6 of securing element 3 are released and securing element 3 may be released from groove 5. The leverage path of the screwdriver is limited by the edge of dismantling window 16, such that there is no excessive strain on holding element 4. Thus, holding element 4 is not destroyed or deformed during the dismantling process.

Thus, holding element 4 may perform a holding function, in addition to the protecting and capturing functions. In such a configuration, securing element 3 performs a securing function.

In FIGS. 5-16, three additional embodiments of the above-described bolt retention are presented.

As shown in FIGS. 5-8 bolt retention 101 differs from bolt retention 1 described above in that securing element 103 includes a narrowing or constriction 121 and a widening 124 in the region of legs 107, which clamps securing element 103 against bolt 102 in the region of the groove 105. Constriction 121 is configured to push on securing element 103. Legs 107 flare out in the region between bends 106 and the respective constriction, such that more force is required to push on securing element 103 than would be required without a constriction 121. Widening 124 is positioned behind constrictions 121 and corresponds to a diameter of bolt 102 in groove 105.

Securing element 103 is held in the locked position in groove 105 by a holding element 104, in addition to being held by the detent surface.

In addition, upper leg 109 of holding element 104 does not include a bend 14 and, accordingly, is not kinked downward in the direction of leg 110 of holding element 104. Rather, corners 120 of the free ends of leg 109 are bent downward onto leg 110 at a slant to the locking direction S. Thus, leg 109 is narrowed at its free end, and the narrowed portion bends down against lower leg 110. Because corners 120 do not extend across an entire width of upper leg 109, bolt retention 101 does not include recesses, such as recesses 12 in bolt retention 1, as does bend 14. At the ends of corners 120, detent surfaces 119 are formed, which prevent securing element 103 and its bends 106 from sliding out of the locked position.

Figure 5:
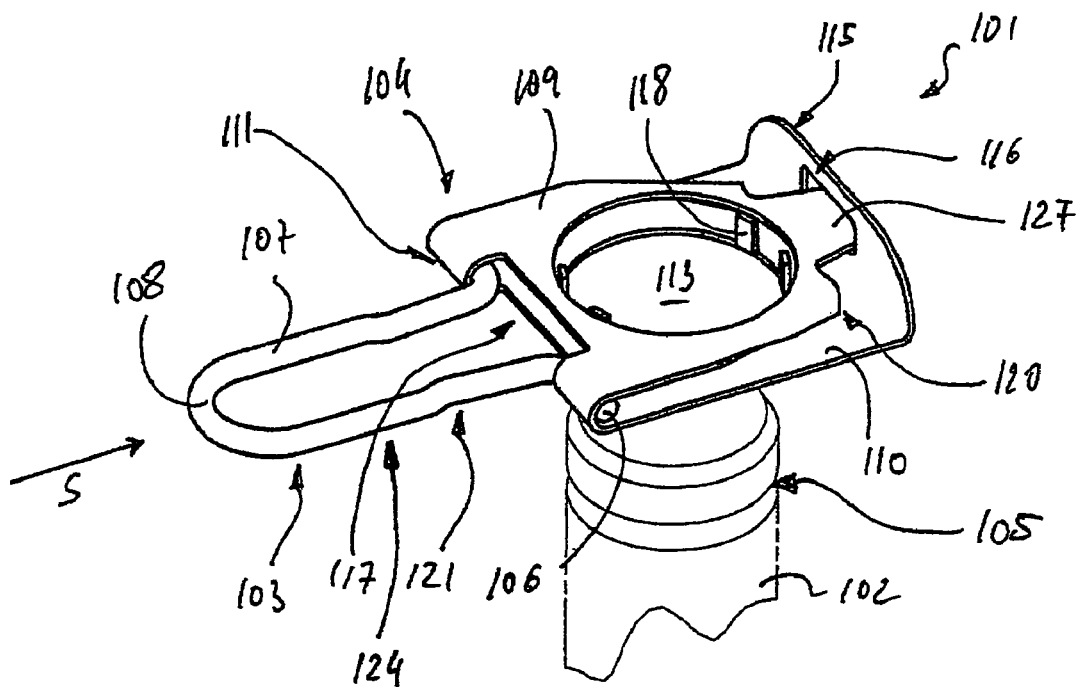
FIG. 5 is a perspective view looking down on a bolt head with another bolt retention according to the present invention, prior to locking.
Figure 8:
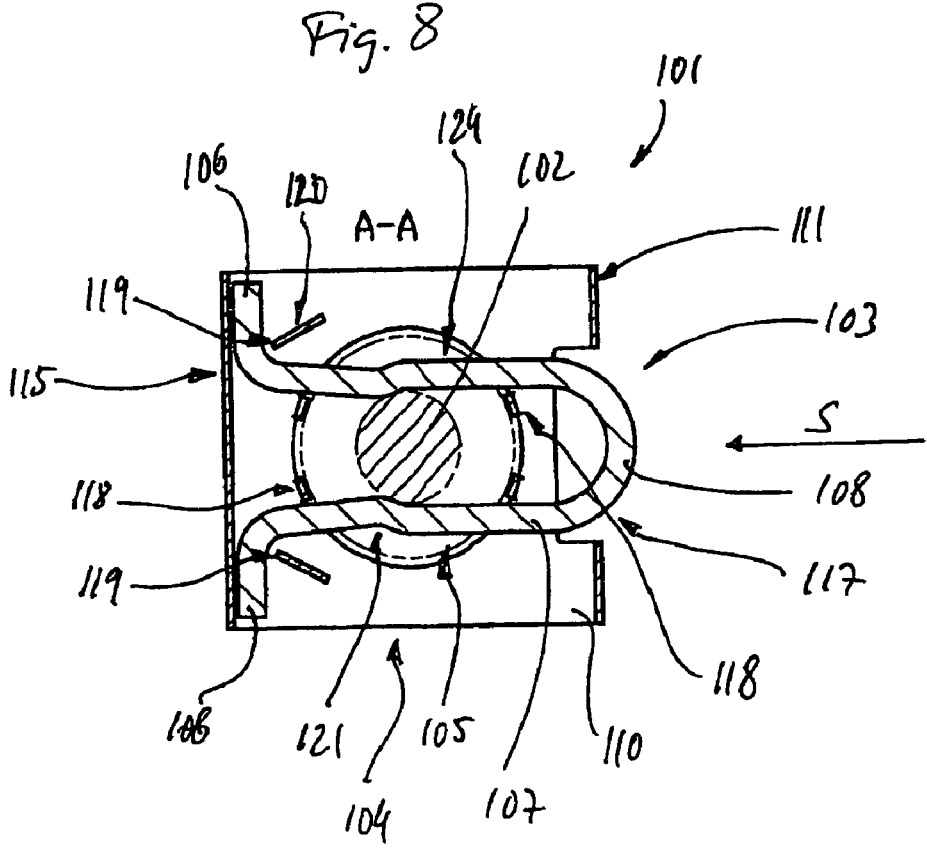
FIG. 8 is a top sectional view of the bolt retention of FIG. 7.
Figure 9:
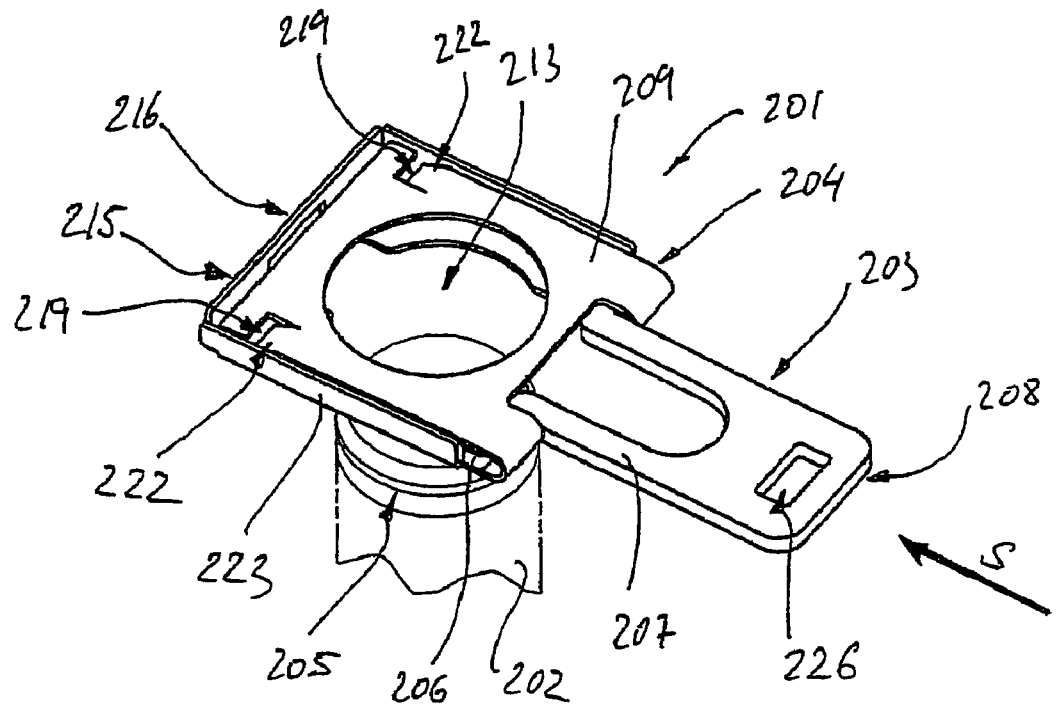
FIG. 9 is a perspective view looking down on a bolt head with another bolt retention according to the present invention, prior to locking.
Figure 10:
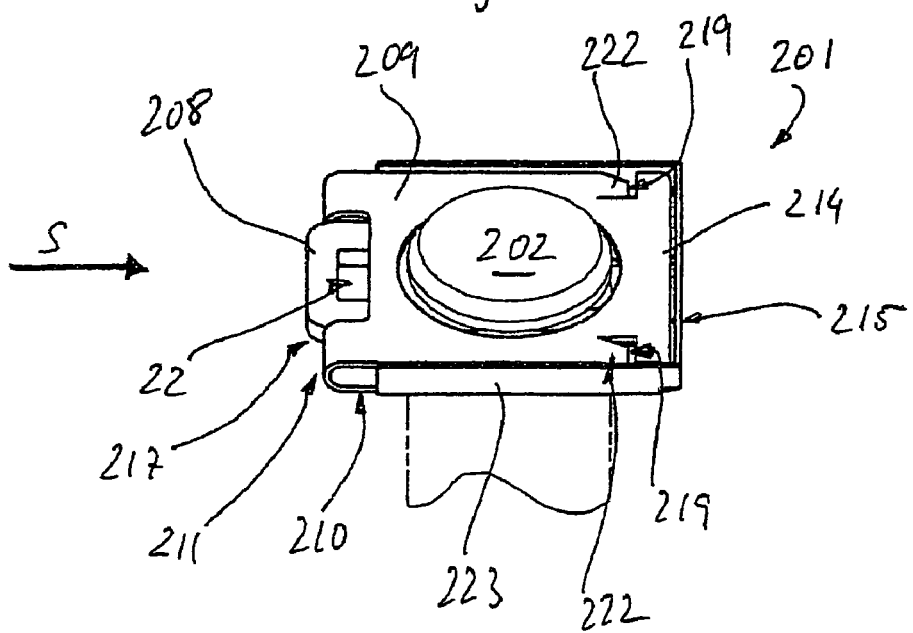
FIG. 10 is a perspective view of the bolt retention of FIG. 9 in the locked position.
Figure 13:
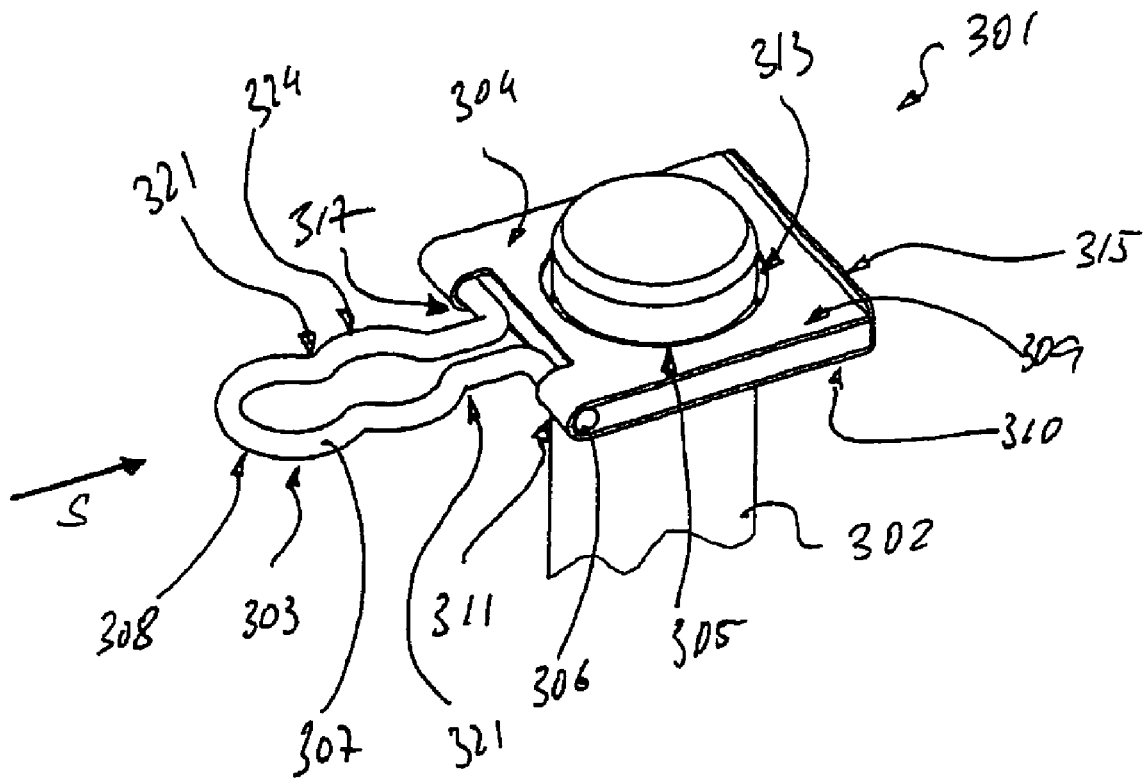
FIG. 13 is a perspective view looking down on a bolt head with another bolt retention according to the present invention, prior to locking.
Figure 14:
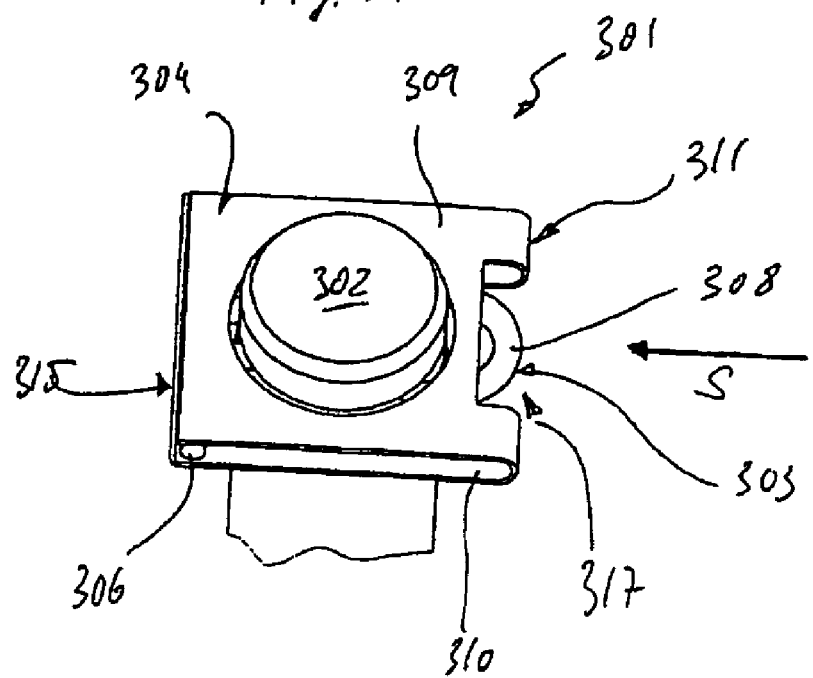
FIG. 14 is a perspective view of the bolt retention of FIG. 13 in the locked position.
Figure 15:
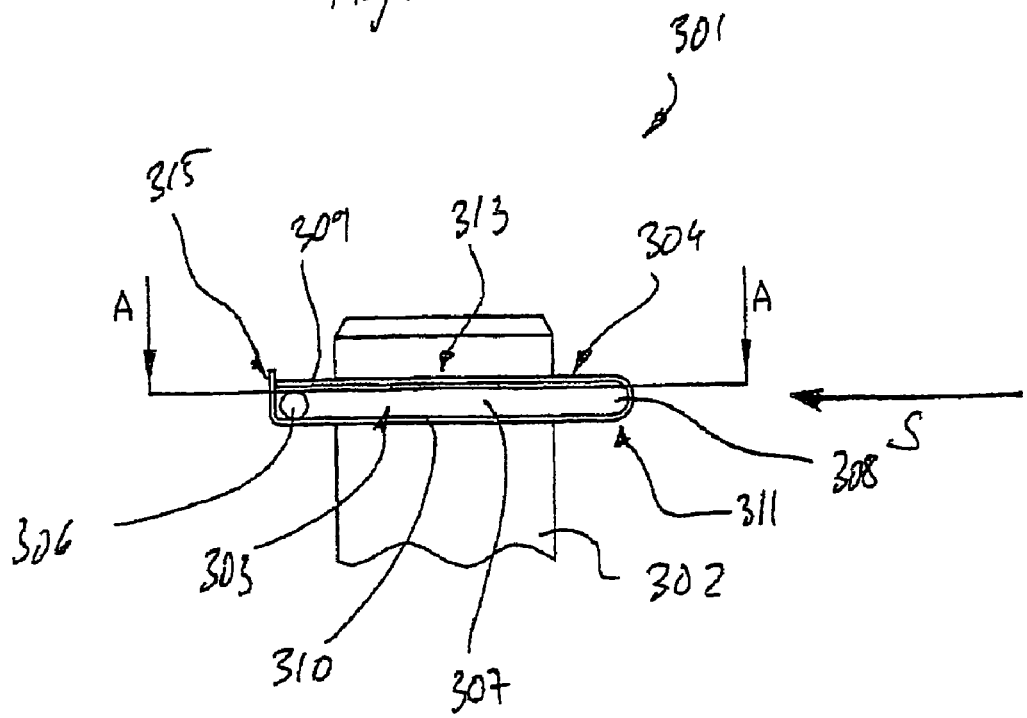
FIG. 15 is a side view of the bolt retention of FIG. 14.
Figure 16:
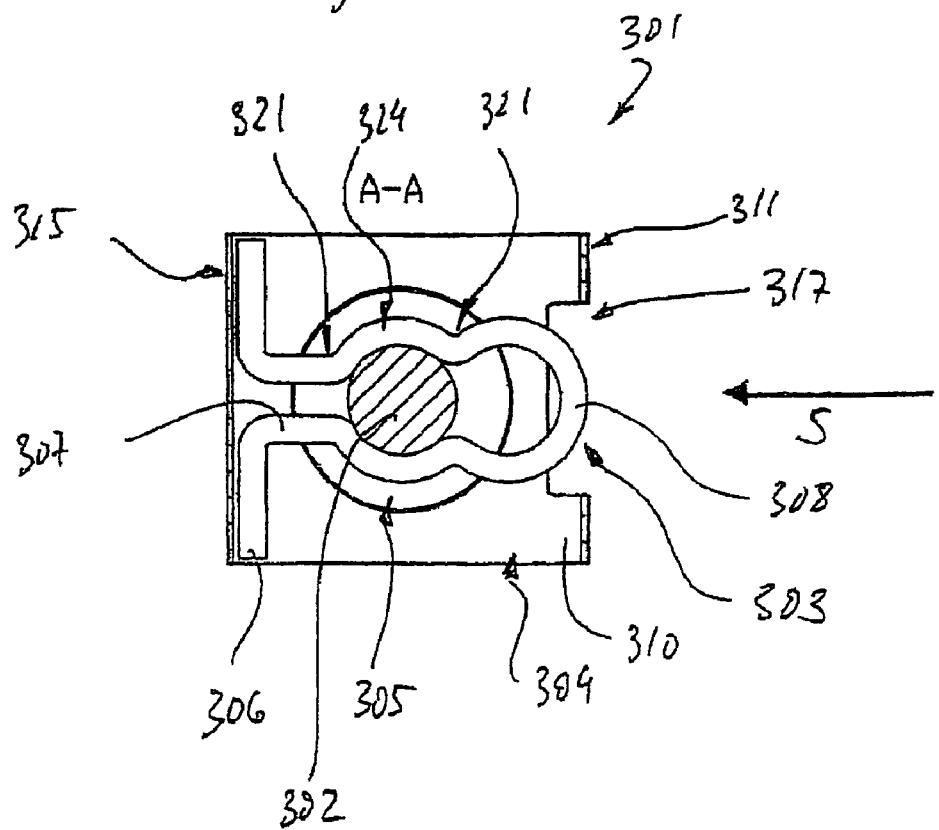
FIG. 16 is a top sectional view of the bolt retention of FIG. 15.

As shown in FIGS. 5 and 8, bolt retention 101 includes four tab-like guide straps 118, as opposed to including two guide straps 18 as in bolt retention 1. Guide straps 118 are spaced apart from one another in a configuration that corresponds to the position of securing element 103 and bolt 102.

Figure 6:
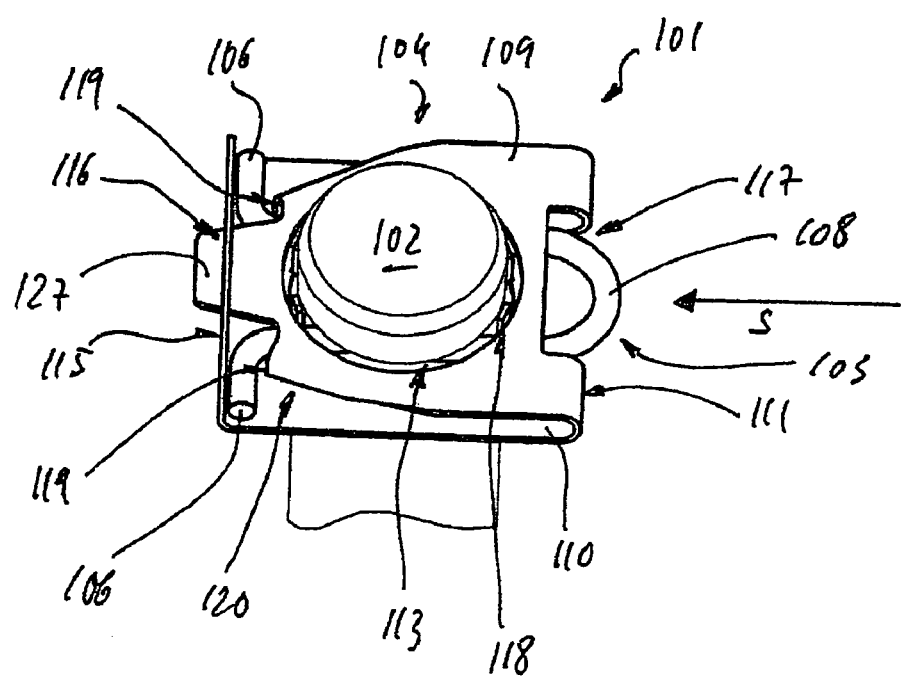
FIG. 6 is a perspective view of the bolt retention of FIG. 5 in the locked position.
Figure 7:
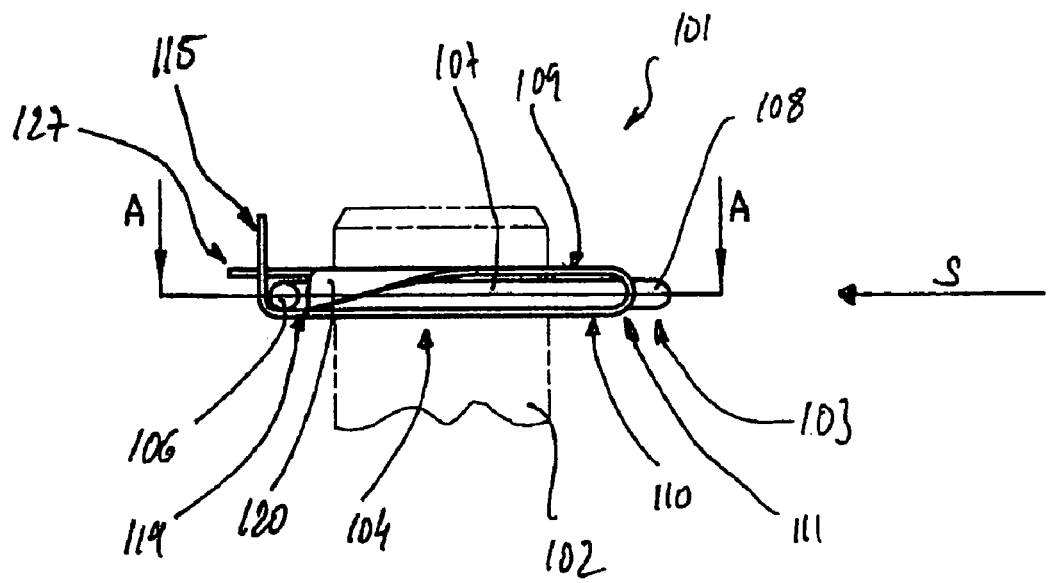
FIG. 7 is a side view of the bolt retention of FIG. 6.

As shown in FIGS. 5-7, to achieve dismantling of the arrangement without the use of a tool or the like, upper leg 109 includes a lever strap 127, which extends through dismantling window 116 and enables upper leg 109 of holding element 104 to be bent up to unlock or release securing element 103 from detent surfaces 119.

Thus, holding element 104 performs a holding function, in addition to the protecting and capturing functions. The securing element 103 performs a holding function, in addition to the securing function.

As shown in FIGS. 9-12, bolt retention 201 comprises a securing element 203 and a holding element 204, which fastens securing element 203 in a groove 205 of a bolt 202.

In contrast to securing elements 3, 103, securing element 203 does not comprise a wire, but rather comprises a U-shaped steel plate, which may be formed, for example, by punching or stamping. In the region of curve 208, which joins individual legs 207 of securing element 203, a grip recess 226 is provided for ease of handling.

In addition, upper leg 209 of holding element 204 includes downwardly bent spring straps 222, which are arranged in the region of the free end of leg 209. Spring straps 222 slope downward from the surface of leg 209 in the locking direction S. The ends of spring straps 222 form detent surfaces 219, which help to prevent securing element 203 from sliding out of the locked position.

Moreover, holding element 204 includes side walls 223 formed by upwardly bent side straps or upward canting of leg 210. Side walls 223 function to at least partially close the space between legs 209 and 210 of holding element 204 at the sides, such that holding element 204 may not bend up at the sides.

Legs 209, 210 may extend slightly toward each other. In addition to including spring straps 222, legs 209, 210 are pretensioned. As shown in FIG. 12, upper leg 209 includes a bend 214, which is directed downward. Thus, the space between legs 209, 210 is essentially closed off, except for a recess 217 and a dismantling window 216. Opening 213 does not include guide straps.

Thus, holding element 204 performs a holding function, in addition to a protecting and a capturing function. Securing element 203 performs a securing function.

As shown in FIGS. 13-16, bolt retention 301 comprises a securing element 303 and a holding element 304. Bolt retention 301 differs from the previously described embodiments in that the fastening of securing element 303 in groove 305 of bolt 302 is not achieved by holding element 304. Rather, securing element 303 includes two constrictions 321 and a widening 324 lying between constrictions 321. Widening 324 corresponds to a diameter of a groove 305 in bolt 302. Thus, widening 324 of securing element 303 grasps bolt 302 at groove 305.

Constrictions 321 are configured such that securing element 303 may be pressed onto groove 305 by forcing legs 307 apart. When first constriction 321 of securing element 303 has passed bolt 302 in groove 305, legs 307 snap back together, and widening 324 grips or clamps bolt 302 in groove 305. Second constriction 321 secures widening 324 around bolt 302 on an opposite side.

In the present embodiment, holding element 304 thrusts against bolt 302 in the locking direction S, which is transverse to the lengthwise direction of bolt 302. Thus, holding element 304 functions to prevent an unintentional loosening of securing element 303. Securing element 303 is positioned at least partially within the outer contour of holding element 304. Therefore, external mechanical forces in or against the locking direction S will be applied to bolt 302 via holding element 304, as opposed to securing element 303.

In addition, because holding element 304 may be captively joined to securing element 303 by bends 306, holding element 304 may perform a capturing function.

Combinations of the four embodiments of bolt retentions 1, 101, 201, 301 described above are possible. Changes and modifications to the specifically described embodiments may be carried out without departing from the principles of the present invention, which is intended to be limited only by the scope of the appended claims as interpreted according to the principles of patent law including the doctrine of equivalents.

The invention claimed is:

1. A bolt retainer for retaining a bolt having a groove, said bolt retainer comprising:

a holding element comprising a generally U-shaped metal plate having an opening, said opening adapted to receive the bolt in an axial direction thereof;

a securing element movable relative to said holding element between a locked position and an open position, said securing element engaging a groove of the bolt in at least opposite regions of the groove when in said locked position, and said securing element being at least partially enclosed by said metal plate when in said locked position;

wherein said securing element is adapted to secure the bolt to said holding element when said securing element is in said locked position at one end of said holding element and allows said holding element to receive the bolt when in said open position at an opposite end of said holding element; and said holding element having a plurality of spring-action detent surfaces, said detent surfaces selectively impeding said securing element from moving from said locked position to said open position.

2. The bolt retainer of claim 1, said holding element including a contour, said contour adapted to at least partially enclose said securing element in said locked position.

3. The bolt retainer of claim 2, wherein said securing element is an essentially U-shaped securing clip.

4. The bolt retainer of claim 3, said U-shaped securing clip having two generally parallel legs, said legs having free end portions bent outwardly from said parallel legs, said free end portions connecting said securing element to said holding element.

5. The arrangement of claim 4, said securing clip including at least one constriction and at least one widening, wherein said securing clip clamps the bolt at the groove in said locked position.

6. The bolt retainer of claim 4, said securing element being secured in said locked position by said free end portions.

7. The bolt retainer of claim 4, said holding element having a curve and two legs joined at one end by said curve, wherein said securing element moves between said legs of said holding element from said open position at one end of said holding element to said locked position at an opposite end of said holding element.

8. The bolt retainer of claim 7, said holding element having a plurality of spring-action detent surfaces, said detent surfaces selectively impeding said securing element from moving from said locked position to said open position.

9. The arrangement of claim 7, wherein said holding element includes canting positioned at least one side of said holding element, said canting at least partially enclosing a space between said legs of said holding element.

10. The bolt retainer of claim 1, wherein said opening is axially passed over the bolt, and wherein said metal plate at least partially encloses said securing element in at least said locked position.

11. The bolt retainer of claim 10, wherein said holding element includes a recess in said curve between said legs of said holding element, said recess being configured to receive said securing element, wherein said securing element is pushed through said recess from said locked position to said open position.

12. An arrangement for axial securing of a bolt having a groove, comprising:
a securing element adapted to engage the groove of the bolt in at least opposite regions of the groove to secure the bolt in a locked position;
a holding element comprising an essentially U-shaped metal plate having a curve and two legs, joined by said curve and a plurality of openings, one in a middle portion of each leg of said metal plate, said openings being adapted to receive the bolt in an axial direction thereof when said openings are axially passed over the bolt, and wherein said metal plate at least partially encloses said securing element in at least said locked position;
wherein said securing element is movable relative to said holding element between said locked position to engage the groove and an open position to loosen said securing element from the bolt;
a plurality of guide straps positioned at one of said legs of said metal plate near said openings, said guide straps having a length greater than a width of the groove of the bolt to prevent said holding element from engaging the groove of the bolt and said holding element having a plurality of spring-action detent surfaces, said detent surfaces selectively impeding said securing element from moving from said locked position to said open position.

13. An arrangement comprising:
a holding element having an opening, said opening adapted to receive the bolt in an axial direction thereof, said holding element having two legs joined at one end, said legs of said holding element comprising an upper leg and a lower leg, said upper leg and said lower leg each having a free end;
a securing element assembled to said holding element, wherein said securing element comprises a essentially U-shaped securing clip having two generally parallel legs, said legs having free end portions bent outwardly from said parallel legs, and wherein said free end portions engage said holding element;
wherein said securing element engages the groove of the bolt in at least opposite regions of the groove and is adapted to secure the bolt in a locked position, and wherein said securing element moves relative to said holding element between the locked position and an open position to loosen said securing element from the bolt, said securing element being selectively held in the locked position at the groove by said holding element, and said securing element being at least partially enclosed by said holding element when in said locked position;
wherein said securing element moves between said legs of said holding element from said open position at one end of said holding element to said locked position at an opposite end of said holding element; and
wherein said free end of said upper leg lies in elastic tension against said lower leg to form at least one detent surface to selectively impede said securing element from moving from said locked position to said open position.

14. The arrangement of claim 13, said lower leg being longer than said upper leg, wherein at least one bend is positioned at said free end of said lower leg, wherein said free end portions of said securing element are secured in said locked position by said at least one bend of said holding element and said at least one detent surface formed by said upper leg.

15. The arrangement of claim 13, wherein said free end of said upper leg is slanted toward said lower leg, said upper leg engaging said lower leg to form said at least one detent surface.

16. The arrangement of claim 15, said at least one detent surface comprising a plurality of spring straps positioned on said free end of said upper leg, said spring straps slanted toward said lower leg to form said at least one detent surface.

17. An arrangement for axial securing of a bolt having a groove, comprising:
a securing element adapted to engage the groove of the bolt in at least opposite regions of the groove to secure the bolt in a locked position;
a holding element having an opening adapted to receive the bolt in an axial direction thereof, and said holding element including a contour, said contour adapted to at least partially enclose said securing element in said locked position;
said securing element comprising an essentially U-shaped securing clip having two generally parallel legs, said legs having free end portions bent outwardly from said parallel legs, said free end portions connecting said securing element to said holding element, wherein said securing element is movable relative to said holding element from said locked position to engage the groove and an open position to loosen said securing element from the bolt;
wherein said holding element has two legs joined at one end, said legs of said holding element comprising an upper leg and a lower leg, said upper leg and said lower leg each having a free end, and wherein said securing element moves between said legs of said holding element from said open position at one end of said holding element to said locked position at an opposite end of said holding element;
wherein said holding element comprises a plurality of spring-action detent surfaces, said detent surfaces operable to selectively impede said securing element from moving from said locked position to said open position; and
wherein said free end of said upper leg is curved toward said lower leg to form a bend, said bend engaging said lower leg to form said detent surfaces, said detent surfaces including a plurality of recesses adapted to allow said legs of said securing element to travel through said recesses.

18. An arrangement for axial securing of a bolt having a groove, comprising:
   a securing element adapted to engage the groove of the bolt in at least opposite regions of the groove to secure the bolt in a locked position;
   a holding element having an opening adapted to receive the bolt in an axial direction thereof, and said holding element including a contour, said contour adapted to at least partially enclose said securing element in said locked position;
   said securing element comprising an essentially U-shaped securing clip having two generally parallel legs, said legs having free end portions bent outwardly from said parallel legs, said free end potions connecting said securing element to said holding element, wherein said securing element is movable relative to said holding element from said locked position to engage the groove and an open position to loosen said securing element from the bolt;
   a dismantling window in said holding element operable to pass a releasing tool to release said securing element from the bolt;
   wherein said holding element has two legs joined at one end, wherein said securing element moves between said legs of said holding element from said open position at one end of said holding element to said locked position at an opposite end of said holding element;
   wherein said legs of said holding element comprise an upper leg and a lower leg, said upper leg and said lower leg each having a free end, wherein said free end of said upper leg lies in elastic tension against said lower leg and forms at least one detent surface to selectively impede said securing element from moving from said locked position to said open position; and
   wherein said lower leg being longer than said upper leg, wherein at least one bend is positioned at said free end of said lower leg, wherein said free end portions of said securing element are secured in said locked position by said at least one bend of said lower leg of said holding element and said at least one detent surface formed by said upper leg of said holding element.

19. The arrangement of claim 18, wherein said dismantling window is positioned at said at least one bend.

20. The arrangement of claim 18, wherein said holding element includes a lever strap to release said securing element from the bolt.

21. The arrangement of claim 18, wherein said free end of said upper leg is slanted toward said lower leg, said upper leg engaging said lower leg to form said at least one detent surface.

* * * * *

UNITED STATES PATENT AND TRADEMARK OFFICE
CERTIFICATE OF CORRECTION

| | | |
|---|---|---|
| PATENT NO. | : 7,568,855 B2 | Page 1 of 1 |
| APPLICATION NO. | : 11/499940 | |
| DATED | : August 4, 2009 | |
| INVENTOR(S) | : Stefan Fitzler et al. | |

It is certified that error appears in the above-identified patent and that said Letters Patent is hereby corrected as shown below:

Column 5:
Line 32, "1 5" should be --15--.

Column 6:
Line 35, "I" should be --1-- after "retention".

Column 8:
Line 50, Claim 1, Delete ";" after "element".

Column 9:
Line 14, Claim 9, Insert --at-- before "least".
Line 33, Claim 12, Delete "," after "legs".
Line 51, Claim 12, Delete "from" after "moving".

Column 11:
Line 17, Claim 18, "potions" should be --portions--.

Signed and Sealed this
Twelfth Day of April, 2011

David J. Kappos
*Director of the United States Patent and Trademark Office*